United States Patent [19]

Farrar, Jr. et al.

[11] Patent Number: 5,185,400
[45] Date of Patent: Feb. 9, 1993

[54] REDUCTION OF RESIDUAL VOLATILES IN STYRENE POLYMERS

[75] Inventors: Ralph C. Farrar, Jr.; David L. Hartsock; Francis X. Mueller, all of Bartlesville, Okla.

[73] Assignee: Phillips Petroleum Company, Bartlesville, Okla.

[21] Appl. No.: 564,811

[22] Filed: Aug. 8, 1990

[51] Int. Cl.⁵ .................................................. C08L 9/00
[52] U.S. Cl. ................................................... 525/98
[58] Field of Search ........................................... 525/98

[56] References Cited

U.S. PATENT DOCUMENTS

| | | | |
|---|---|---|---|
| 3,629,387 | 12/1971 | Watanabe et al. | 264/209 |
| 3,637,554 | 1/1972 | Childers | 260/23.7 R |
| 3,906,058 | 9/1975 | Durst | 260/876 B |
| 3,907,931 | 9/1975 | Durst | 525/98 |
| 4,031,166 | 6/1977 | Bronstert et al. | 525/98 |
| 4,073,831 | 2/1978 | Tabana et al. | 260/876 B |
| 4,076,768 | 2/1978 | Saunders et al. | 525/98 |
| 4,096,224 | 6/1978 | Simon et al. | 264/92 |
| 4,124,658 | 11/1978 | Camerman | 260/880 R |
| 4,173,597 | 11/1979 | Willcox et al. | 525/98 |
| 4,252,764 | 2/1981 | Tokas | 264/142 |
| 4,267,284 | 5/1981 | Kitchen | 525/99 |
| 4,839,418 | 6/1989 | Schwaben et al. | 525/53 |

*Primary Examiner*—Melvyn I. Marquis
*Attorney, Agent, or Firm*—Morrison Bennett

[57] ABSTRACT

Residual volatiles in styrene polymers can be reduced by combining a minor amount of a styrene-conjugated diene block copolymer with the styrene polymer.

5 Claims, No Drawings

REDUCTION OF RESIDUAL VOLATILES IN STYRENE POLYMERS

BACKGROUND OF THE INVENTION

This invention relates to styrene polymers.

Taste, odor and compliance with government regulations are important considerations when styrene resins are used for food container applications. Residual impurities associated with bad odor and release of styrene monomer from styrene polymer products are unacceptable above levels at which these effects become noticeable.

SUMMARY OF THE INVENTION

It is an object of this invention to provide compositions from which styrene polymer products with reduced residual styrene monomer can be made.

It is another object of this invention to provide a method of making styrene resin compositions from which products with reduced residual styrene monomer can be made.

It is yet another object of this invention to provide a method for making polystyrene products with reduced residual styrene monomer.

In accordance with one embodiment of this invention a composition comprising a minor amount of a styrene-butadiene copolymer and a major amount of styrene polymer is extruded through a devolatilizing extruder and residual volatile compounds are removed. In another embodiment of this invention an easily devolatilized composition is provided comprising a major amount of polystyrene and a minor amount of a resinous styrene-butadiene block copolymer having greater than 50 weight percent by weight based on weight of the block copolymer of styrene.

DETAILED DESCRIPTION OF THE INVENTION

The total quantities of residual impurities, such as solvents, monomers or byproducts, in a polymer resin can be measured by completely dissolving the resin in a suitable solvent. The resulting solution can be analyzed by gas chromatography as described more fully later with the results given in terms of parts per million (ppm) of the residual components detected.

It is believed that most of the objectionable volatile residuals contained in styrene polymers such as polystyrene are one or more of the following: styrene monomer, alpha-methyl styrene and solvents such as ethylbenzene, isopropyl benzene, indane, n-propyl benzene and toluene. Thus a process which will reduce the presence of these volatiles in styrene polymers such as polystyrene will be useful. This invention is particularly concerned with the reduction of residual styrene contained in styrenic polymers because of governmental standards for amounts of residual styrene permitted in products which may come into contact with food or drink for human consumption.

While the applicants do not wish to be bound by theory, they state that is is believed that volatile residual aromatic compounds present in certain resinous/rubbery block copolymers are more readily given off to the atmosphere than the same materials are when retained in polystyrene materials. Thus, combining minor amounts of these block copolymers with polystyrene facilitates the release of volatile residual compounds from the polystyrene in the resulting composition.

The styrene polymer employed in the methods and compositions of this invention is usually (a) a homopolymer of styrene; or (b) a copolymer of styrene as a major component with a minor amount, e.g., 20 weight percent, of any other copolymerizable monovinyl aromatic compound other than styrene, such as alpha-methylstyrene or vinyltoluene. A high impact polystyrene (HIPS) can be employed. High impact polystyrenes can be prepared by polymerizing styrene in the presence of an elastomer, typically polybutadiene rubber. In these resins the styrene forms a continuous phase throughout which the rubber particles are dispersed. A minor amount, e.g., up to 20 weight percent of other monomers such as methyl acrylate, methyl methacrylate, acrylonitrile and the like can be copolymerized with the styrene.

In bulk polymerization, the styrene resins useful in this invention are commonly prepared by heating the styrene and any comonomer at temperatures in the range of 100° to 200° C. with application of pressure, if necessary, to combine the monomers. The polymerization can also be carried out at lower temperatures by the addition of free-radical generating peroxidic catalysts such as benzoyl peroxide, acetyl peroxide, di-t-butyl peroxide and the like. The polymerization can also be carried out in suspension to yield a dry powder or in emulsion, usually resulting in a latex of polystyrene which can be coagulated to yield the solid powdery polystyrene. The polymerization can also be carried out in solution with precipitation of the product, if desired. Solvent can be removed by standard techniques such as steamstripping or solvent evaporation.

The copolymers broadly applicable to the devolatilization processes of this invention include such block copolymers as the types AB, ABA, tapered AB and ABA and radial (star block) copolymers, where A represents a polymerized monovinyl aromatic compound, usually styrene, and B represents a polymerized conjugated diene, usually 1,3-butadiene. Sufficient block polystyrene must be present to insure compatibility with the polystyrene (at least about 20 weight percent and more preferably at least 50 weight percent of the block copolymer). The rubbery block could be polybutadiene, a random or tapered styrene-butadiene copolymer or polyisoprene or random or tapered styrene-isoprene copolymer.

The copolymers of the novel compositions of this invention include such block copolymers as the types AB, ABA, tapered AB and ABA and radial (star block) copolymers, where A represents a polymerized monovinyl aromatic compound, usually styrene, and B represents a polymerized conjugated diene, usually 1,3-butadiene. Sufficient block polystyrene must be present to insure compatibility with the polystyrene (at least about 20 weight percent and more preferably at least 50 weight percent of the block copolymer). The rubbery block could be polybutadiene, a random or tapered styrene-butadiene copolymer or polyisoprene or random or tapered styrene-isoprene copolymer.

The polymodal styreme-butadiene block copolymers having a Shore D hardness as measured by ASTM D-2740 of about 60 or higher, more preferably from about 64 to about 80, are presently preferred. These copolymers, not having rubbery properties, contain from about 50 to about 95 weight percent polymerized styrene, most preferably from about 70 to 80 weight percent polymerized styrene, based on total weight of the copolymer. They are prepared so that at least a portion of the final product is of a coupled character, linear or branched or both linear and branched. These polymodal block copolymers can be prepared by sequential charge copolymerization as described in U.S. Pat. No. 4,584,346, which is hereby incorporated herein by reference.

It has been found that release of impurities in styrene resins is enhanced by blending with the styrene resin from about 1 to about 25 weight percent, preferably from about 1 to about 12 weight percent, and most preferably from 1 to 10 weight percent based on total weight of the composition, of block copolymers derived from a monovinyl substituted aromatic compound and a conjugated diene. Table 1 below shows the relative amounts of styrene polymer and styrene-butadiene block copolymer in typical blends of this invention.

TABLE 1

Inventive Blends
(Weight Percents Based on Total Weight of the Composition)

| Range | Styrene Polymer | Styrene-Butadiene Copolymer |
|---|---|---|
| Broad | 75–99% | 1–25% |
| Intermediate | 88–99% | 1–12% |
| Narrow | 90–99% | 1–10% |

The preferred block copolymers useful in this invention contain from about 50 to about 95 weight percent polymerized styrene, the remainder being polymerized conjugated diene, preferably butadiene and/or isoprene (i.e., from about 50 to about 5 weight percent conjugated diene). Thus, the total styrene content of the inventive compositions, which includes the amount introduced as styrene polymer and the amount introduced in the block copolymer, is from about 87.5 to about 99.95 weight percent, preferably from about 94 to about 99.95 weight percent, and most preferably from about 95 to about 99.95 weight percent, based on total weight of the composition. This is summarized in Table 2. However, other ingredients can be present in an amount in the range from greater than 0 to about 5 weight percent based on total weight of the composition. These include stabilizers, fillers, colorants and antiblocking agents, plasticizers, processing aids, et cetera.

TABLE 2

Percentages of Styrene Resin and Polymerized Butadiene in Composition after Blending Styrene-Butadiene Copolymer and Styrene Resin

| Range | Weight Percent Styrene Resin (based on total weight of composition) | Weight Percent Polymerized Butadiene (based on total |
|---|---|---|
| Broad | 87.5–99.95 | 12.5–0.05 |
| Intermediate | 94.0–99.95 | 6–0.05 |
| Narrow | 95.0–99.95 | 5–0.05 |

Some sample formulatins and resulting proportions of styrene and butadiene include those shown in Table 3 below.

The devolatilization processes of this invention are accomplished by (a) passing the styrene polymer and styrene-diene copolymer into a melting and devolatilizing zone; (b) melting the blend to produce a melt; (c) withdrawing volatiles from said melt to produce a devolatilized melt; (d) removing the devolatilized melt from the devolatilizing zone; and (e) cooling the devolatilized melt to produce a devolatilized product.

TABLE 3

Sample Inventive Compositions Employing Styrene Homopolymers

| Copolymer-Polystyrene (100 g) | Styrene-Butadiene in Copolymer | Polymerized grams Butadiene in Copolymer | Polymerized grams Styrene in Copolymer | Total Polystyrene in Composition | Total Polymerized Butadiene in Composition |
|---|---|---|---|---|---|
| 1% copolymer, 99% polystyrene | 5% butadiene, 95% styrene | 0.05 | 0.95 | 99.95% | 0.05% |
| 1% copolymer, 99% polystyrene | 50% butadiene, 50% styrene | 0.5 | 0.5 | 99.5% | 0.5% |
| 10% copolymer, 90% polystyrene | 5% butadiene, 95% styrene | 0.5 | 9.5 | 99.5% | 0.5% |
| 10% copolymer, 90% polystyrene | 50% butadiene, 50% styrene | 5.0 | 5.0 | 95.0% | 5.0% |
| 12% copolymer, 88% polystyrene | 5% butadiene, 95% styrene | 11.4 | 0.6 | 99.4% | 0.6% |
| 12% copolymer, 88% polystyrene | 50% butadiene, 50% styrene | 6.0 | 6.0 | 94.0% | 6.0% |
| 25% copolymer, 75% polystyrene | 5% butadiene, 95% styrene | 23.75 | 1.25 | 98.75% | 1.25% |
| 25% copolymer, 75% polystyrene | 50% butadiene, 50% styrene | 12.5 | 12.5 | 87.5% | 12.5% |

EXAMPLE

A series of compositions each containing crystal polystyrene and a minor amount of a resinous, polymodal block copolymer of styrene and 1,3-butadiene were prepared by tumble mixing pellets of each component to obtain uniform blends. The crystal polystyrene used is commercially available from the Chevron Chemical Company, Houston, Tex., as grade 3710. The block copolymer used is commercially available from the Phillips 66 Company, Pasadena, Tex., as KR04 K-Resin ® polymer having a bound styrene content of 75 percent by weight.

Each blend and the polystyrene control were subsequently passed through a 40 mm compounding-/devolatilizing electrically heated extruder equipped with counter-rotating, intermeshing twin-screws. The extruder used was a ZSK-40, a product of Werner-Pfleiderer Corporation, Ramsay, N.J. The machine has 3 spaced apart vent zones located along the length of the barrel which are in communication with the internal bore as known in the art. A vacuum can be used with each vent zone to help remove volatile material associated with a molten, polymeric blend as it is passed through the extruder. Each sample was extruded at the rate of 36 kg/hour (79.4 lbs/hour), passed through a strand die, cooled and pelletized. The pellets can be further dried if desired.

The extrusion conditions employed were as follows:

| | |
|---|---|
| Screw speed | 400 rpm |
| Extruder temperature | 180° C. (356° F.) |
| Die temperature | 172° C. (≅342° F.) |
| Melt temperature | 257° C. (≅395° F.) |
| Vacuum | 12 mm Hg |
| Water rate | 0.23 kg/hour (0.51 lbs/hour) |

The water was injected into the melted polymer just ahead of the first vent zone to assist in the removal of styrene monomer and other volatile matter that might have been present.

The samples to be used for the determination of residual styrene associated with the extruded pellets were taken after 40 kg (88.2 lbs.) of material had been collected from each run. Each freshly collected sample was placed in a jar having a screw type cap to retard loss of any volatile compounds. The residual volatiles present in each sample was determined by solvent extraction. In this method one gram of pellets is dissolved in methylene chloride with methylcyclohexane used as an internal standard. An aliquot of the polymer solution is injected into a gas chromatograph (0.2% Carbowax 1500 on Carbopack C column) with the polymer itself retained on a glass liner in the injection port. Analysis of the resulting chromatograms provided the results in terms of parts per million styrene.

Styrene is a major residual component present in polystyrene. However, presence of other volatiles such as ethylbenzene, isopropylbenzene and toluene is also an important consideration.

Table 4 shows residual volatiles present in three different inventive blends after devolatilization of the samples.

As seen in Table 4, the polystyrene control as received shows some variation in the contained residual compounds, particularly styrene. This is probably due to the large amount of resin received and the randomly selected, about 10 g, samples for the residuals determination. However, after devolatilization of about 40 kg, duplicate samples taken for residuals determination are in close agreement.

The results in Table 4 show that devolatilization alone is effective in reducing the styrene level in polystyrene from its initial level of 704 ppm (average of two runs) to 149 ppm (average of two runs). However, invention runs clearly show that the addition of minor amounts of KR04 added to polystyrene substantially reduce styrene levels even more.

In determining the "percentage improvement" results the average of each duplicate set was used as the basis for the calculations. Thus, the percentage improvement in residual styrene for the blend containing 2 weight percent KR04 was 33.9%. Similarly, the percentage improvement in residual styrene for the blends containing 5 weight percent KR04 and 10 weight percent KR04 was 42.6 weight percent and 50.7 weight percent, respectively.

TABLE 4

| Resin, wt. % | | Devolatilization of Resins Showing Duplicate Runs | | | | Calculated Percentage |
|---|---|---|---|---|---|---|
| | | Residual Volatiles, parts per million | | | | |
| Polystyrene | KR04[a] | Toluene | Ethylbenzene | Isopropylbenzene | Styrene | Improvement for Styrene Removal |
| 100[b] | — | 4 | 3 | n.d.[c] | 854 | — |
| 100[b] | — | 4 | 3 | 1 | 553 | — |
| 100[d] | — | 3 | 1 | <1 | 147 | — |
| 100[d] | — | 4 | n.d. | n.d. | 151 | — |
| — | 100[e] | 3 | 10 | 5 | 8 | — |
| 98 | 2 | 2 | n.d. | n.d. | 99 | 33.9 |
| 98 | 2 | 2 | n.d. | <1 | 98 | |
| 95 | 5 | 1 | n.d. | n.d. | 87 | 42.6 |
| 95 | 5 | 1 | n.d. | n.d. | 84 | |
| 90 | 10 | 1 | n.d. | n.d. | 70 | 50.7 |
| 90 | 10 | 1 | n.d. | n.d. | 77 | |

[a] A butadiene/styrene block copolymer available from Phillips Petroleum Company.
[b] Polystyrene control as received.
[c] "n.d." indicates not detected.
[d] Polystyrene control after devolatilization.
[e] KR04 control as received.

While the articles of manufacture, the processes and compositions of this invention have been described in detail for the purpose of illustration, the inventive articles, processes and compositions are not to be construed as limited thereby. This patent is intended to cover all changes and modifications within the spirit and scope thereof.

That which is claimed is:

1. A composition consisting essentially of: (a) styrene polymer chosen from homopolymer and copolymers of styrene with up to about 20 weight percent of a compound chosen from the group consisting of another copolymerizable monovinylaromatic compound, methyl acrylate, methylmethacrylate and acrylonitrile and (b) resinous styrene-butadiene copolymer said copolymer consisting essentially of blocks of styrene homopolymer and blocks of butadiene homopolymer said styrene-butadiene copolymer present in an amount sufficient to facilitate the release of volatile residual compounds from said styrene polymer in the composition when subjected to melting and devolatilization treatment.

2. A composition as recited in claim 1 wherein said styrene-butadiene block copolymer comprises from about 50 to about 95 weight percent, based on total weight of said styrene-butadiene block copolymer, of styrene,
and said styrene polymer is at least 80 weight percent, based on weight of the styrene polymer, polystyrene.

3. A composition as recited in claim 1 wherein:
said styrene polymer is present in an amount within the range of about 75 to about 99 weight percent, based on total weight of the composition; and
said styrene-butadiene block copolymer is present in an amount in the range of about 1 to about 25 weight percent, based on total weight of the composition.

4. A composition as recited in claim 1 wherein:

said styrene polymer is present in an amount within the range of about 88 to about 99 weight percent, based on total weight of the composition, and
said styrene-butadiene block copolymer is present in an amount in the range of about 1 to about 12 weight percent, based on total weight of the composition.

5. A composition as recited in claim 1 wherein:
said styrene polymer is present in an amount within the range of about 90 to about 99 weight percent, based on total weight of the composition, and
said styrene-butadiene block copolymer is present in an amount in the range of about 1 to about 10 weight percent, based on total weight of the composition.

* * * * *